United States Patent
Lee et al.

(10) Patent No.: US 7,529,179 B1
(45) Date of Patent: May 5, 2009

(54) JOINT MAXIMUM LIKELIHOOD ESTIMATION OF INTEGER CARRIER FREQUENCY OFFSET AND CHANNEL IN OFDM SYSTEMS

(75) Inventors: Jungwon Lee, Cupertino, CA (US); Dimitrios-Alexandros Toumpakaris, Sunnyvale, CA (US); Hui-Ling Lou, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 595 days.

(21) Appl. No.: 11/218,809

(22) Filed: Sep. 2, 2005

Related U.S. Application Data

(60) Provisional application No. 60/652,446, filed on Feb. 11, 2005.

(51) Int. Cl.
H04J 11/00 (2006.01)
(52) U.S. Cl. .................................... 370/208; 370/343
(58) Field of Classification Search ................ 370/208, 370/343
See application file for complete search history.

(56) References Cited

U.S. PATENT DOCUMENTS

| | | | |
|---|---|---|---|
| 2003/0128751 A1* | 7/2003 | Vandenameele-Lepla ... | 375/229 |
| 2004/0001563 A1* | 1/2004 | Scarpa ........................ | 375/326 |
| 2005/0175114 A1* | 8/2005 | Jones et al. .................. | 375/260 |
| 2006/0039491 A1* | 2/2006 | Han, II ........................ | 375/260 |
| 2007/0133391 A1* | 6/2007 | Roh et al. .................... | 370/208 |

OTHER PUBLICATIONS

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11g/D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

(Continued)

Primary Examiner—Melvin Marcelo

(57) ABSTRACT

An Orthogonal Frequency Division Multiplexing (OFDM) receiver is provided that receives a modulated OFDM signal through a channel. The OFDM receiver includes an RF downconverter that generates a downconverted modulated OFDM signal based on the modulated OFDM signal, an analog-to-digital converter (ADC) that generates digitized OFDM symbols based on the downconverted modulated OFDM signal, a carrier-phase correction module that generates time-domain symbols based on the digitized OFDM symbols, a fast Fourier transform (FFT) module that generates frequency-domain symbols based on the time-domain symbols, and an estimator module that receives the frequency-domain symbols and determines an integer carrier frequency offset (CFO) estimate and a channel estimate and that generates respective integer CFO estimate and channel estimate signals.

33 Claims, 10 Drawing Sheets

OTHER PUBLICATIONS

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

802.11n; IEEE P802.11-04/0889r6; Wireless LANs, TGn Sync Proposal Technical Specification; 131 pages.

ML Estimation of Time and Frequency Offset in OFDM Systems; Jan-Jaap van de Beek, Student Member IEEE, Magnus Sandell, Student Member, IEEE, and Per Ola Borjesson, Member, IEEE; IEEE Transactions on Signal Processing, vol. 45, No. 7, Jul. 1997, pp. 1800-1805.

Comparison of Integer Frequency Offset Estimators for OFDM Systems; Chen Chen, Jiandong Li, and Linjing Zhao, Broadband Wireless Communications Laboratory, Information Science Institute, State Key Laboratory of Integrated Service Networks, Xidian University, Xi'an 710071, China; 2004 IEEE; pp. 2371-2375.

Frequency Synchronization Algorithms for OFDM Systems suitable for Communication over Frequency Selective Fading Channels; Ferdinand Classen, Heinrich Meyr; Aachen University of Technology; ISS; Templergraben 55, 52056 Aachen, Germany; 1994 IEEE; pp. 1655-1659.

Approximate Maximum Likelihood Estimation of Integer Carrier Frequency Offset in OFDM Systems; Jungwon Lee, Hui-Ling Lou, and Dimitris Toumpakaris, Marvell Semiconductor, Inc.; 5 pages.

Periodic Sequences with Optimal Properties for Channel Estimation and Fast Start-Up Equalization; A. Milewski, IBM J. Res. Develop., vol. 17, No. 5, Sep. 1983; pp. 426-431.

A Technique for Orthogonal Frequency Division Multiplexing Frequency Offset Correction; Paul H. Moose, Member, IEEE; IEEE Transactions on Communications, vol. 42, No. 10, Oct. 1994; pp. 2908-2914.

Frequency Ambiguity Resolution in OFDM Systems, M. Morelli, A. N. D'Andrea, and U. Mengali, IEEE Communication Letters, vol. 4, No. 4, Apr. 2000; pp. 134-136.

Robust Frequency and Timing Synchronization for OFDM; Timothy M> Schmidl and Donald C. Cox, Fellow, IEEE; IEEE Transactions on Communications, vol. 45, No. 12, Dec. 1997; pp. 1613-1621.

COFDM: An Overview; William Y. Zou, Public Broadcasting Service, Yiyan Wu, Communications Research Centre, IEEE Transactions on Broadcasting, vol. 41, No. 1, Mar. 1995; pp. 1-8.

IEEE Std 802. 11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology - Telecommunications and information exchange between systems - Local and metropolitan area networks - Specific requirements - Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages, 1999.

802.11n; IEEE P802.11-04/0889r6; Wireless LANs, TGn Sync Proposal Technical Specification; 131 pages May 2005.

Comparison of Integer Frequency Offset Estimators for OFDM Systems; Chen Chen, Jiandong Li, and Linjing Zhao, Broadband Wireless Communications Laboratory, Information Science Institute, State Key Laboratory of Integrated Service Networks, Xidian University, Xi'an 710071, China; 2004 IEEE; pp. 2371-2375, 2004.

Approximate Maximum Likelihood Estimation of Integer Carrier Frequency Offset in OFDM Systems; Jungwon Lee Hui-Ling Lou, and Dimitris Toumpakaris, Marvell Semiconductor, Inc.; 5 pages, undated.

* cited by examiner

JOINT MAXIMUM LIKELIHOOD ESTIMATION OF INTEGER CARRIER FREQUENCY OFFSET AND CHANNEL IN OFDM SYSTEMS

CROSS-REFERENCE TO RELATED APPLICATIONS

This application claims the benefit of U.S. Provisional Application No. 60/652,446, filed on Feb. 11, 2005. The disclosure of the above application is incorporated herein by reference.

FIELD OF THE INVENTION

The present invention relates to methods for estimating carrier frequency offset and channel in an orthogonal frequency division multiplexing (OFDM) receiver.

BACKGROUND OF THE INVENTION

In many communication systems, carrier frequency offset (CFO) may appear at a receiver due to a mismatch between a carrier frequency of a received signal and a local oscillator frequency of the receiver. Since CFO can adversely affect receiver performance, CFO estimation and correction algorithms may need to be employed to provide satisfactory performance from the receiver.

OFDM is sometimes used as a modulation scheme in wireless communication systems such as, by way of non-limiting example, wireless local area networks (WLAN), fixed wireless access, digital audio broadcasting (DAB), and digital video broadcasting (DVB). A desirable aspect of OFDM is that relatively simple equalization can be achieved in an OFDM receiver. This makes OFDM desirable in wireless applications with changing channel conditions. OFDM also benefits from efficient implementations of the fast Fourier transform (FFT) that can be used to modulate and demodulate the transmitted data.

To improve decoding accuracy of OFDM receivers, synchronization and channel estimation algorithms may be used. Synchronization generally includes estimation of the CFO, symbol timing of the received data, carrier phase offset, and sampling rate offset.

The CFO can have adverse effects on the performance of a system. The signal-to-noise ratio can be adversely affected when the CFO is smaller than an OFDM subcarrier bandwidth. If an integer part of the normalized CFO, which can be defined as the CFO normalized to the subcarrier bandwidth, is greater than one, then a cyclic shift of the subcarriers will occur at the receiver.

SUMMARY OF THE INVENTION

An Orthogonal Frequency Division Multiplexing (OFDM) receiver is provided that receives a modulated OFDM signal through a channel. The OFDM receiver includes an RF downconverter that generates a downconverted modulated OFDM signal based on the modulated OFDM signal, an analog-to-digital converter (ADC) that generates digitized OFDM symbols based on the downconverted modulated OFDM signal, a carrier-phase correction module that generates time-domain symbols based on the digitized OFDM symbols, a fast Fourier transform (FFT) module that generates frequency-domain symbols based on the time-domain symbols, and an estimator module that receives the frequency-domain symbols and determines an integer carrier frequency offset (CFO) estimate and a channel estimate and that generates respective integer CFO estimate and channel estimate signals.

In other features, the RF downconverter includes a local oscillator that operates at a first frequency based on the integer CFO estimate signal. The carrier-phase correction module can adjust a phase of the time-domain symbols based on the integer CFO estimate signal. The FFT module can adjust a rotation of the frequency-domain symbols based on the integer CFO signal. The OFDM receiver can also include a Viterbi decoder module that receives the frequency-domain symbols and that receives the channel estimate signal.

In other features, the integer CFO estimate is based on $$\hat{L} = \underset{l}{\operatorname{argmax}} |\tilde{X}^{(l)*} Y|,$$

where l represents an integer CFO, $\tilde{X}^{(l)}$ represents transmitted pilot OFDM symbols that are cyclically shifted by l, and Y represents the frequency-domain symbols. The channel estimate can include a channel phase estimate that is based on $\hat{\Theta} = \angle(\tilde{X}^{(\hat{L})*} Y)$, where $\tilde{X}^{(\hat{L})}$ represents transmitted pilot OFDM symbols that are cyclically shifted by $\hat{L}$, $\hat{L}$ represents the integer CFO estimate, and Y represents the frequency-domain symbols.

In other features, the integer CFO estimate is based on $$\hat{L} = \underset{l}{\operatorname{argmax}} \left\{ \sum_{k=0}^{N-1} \left| \sum_{m=0}^{M-1} e^{-j2\pi l m \alpha} X_m^*[k-l] Y_m[k] \right|^2 \right\},$$

where l represents an integer CFO, N represents a number of data samples, M represents a number of transmitted pilot OFDM symbols, and α represents a ratio of a number of cyclic prefix samples ($N_g$) to N. The channel estimate can be based on $$\hat{H}[k-\hat{L}] = \frac{\sum_{m=0}^{M-1} e^{-j2\pi \hat{L} m \alpha} X_m^*[k-\hat{L}] Y_m[k]}{M},$$

where $\hat{L}$ represents the integer CFO estimate, M represents a number of transmitted pilot OFDM symbols, α represents a ratio of a number of cyclic prefix samples ($N_g$) to a number of data samples (N), $X_m$ represents the $m^{th}$ transmitted pilot OFDM symbol, $\hat{L}$ represents the integer CFO estimate, $Y_m$ represents the $m^{th}$ frequency-domain symbol, and k represents a subcarrier index.

In other features, the receiver is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5. The receiver can include a cyclic prefix removal module that generates second time-domain symbols based on the time-domain symbols, wherein the FFT module generates the frequency-domain symbols based on the second time-domain symbols, and wherein a phase of the time-domain symbols is adjusted based on the integer CFO estimate signal.

A method is provided for receiving a modulated Orthogonal Frequency Division Multiplexing (OFDM) signal through a channel. The method includes generating a downconverted modulated OFDM signal based on the modulated OFDM signal, generating digitized OFDM symbols based on the downconverted modulated OFDM signal, generating time-domain symbols based on the digitized OFDM symbols, generating frequency-domain symbols based on the time-domain symbols, determining an integer carrier frequency offset (CFO) estimate based on the frequency-domain symbols and generating a corresponding CFO estimate signal, and determining a channel estimate based on the frequency-domain symbols and generating a corresponding channel estimate signal.

In other features, the downconverting step includes operating a local oscillator at a first frequency based on the integer CFO estimate signal. The method can include adjusting a phase of the time-domain symbols based on the integer CFO estimate signal. The method can include adjusting a rotation of the frequency-domain symbols based on the integer CFO signal. The method can include applying the frequency-domain symbols and the channel estimate signal to a Viterbi decoding algorithm.

In other features, the integer CFO estimate is based on $$\hat{L} = \underset{l}{\mathrm{argmax}} \left| \tilde{X}^{(l)*} Y \right|,$$

where l represents an integer CFO, $\tilde{X}^{(l)}$ represents transmitted pilot OFDM symbols that are cyclically shifted by l, and Y represents the frequency-domain symbols. The channel estimate can include a channel phase estimate that is based on $\hat{\Theta} = \angle(\tilde{X}^{(\hat{L})*}Y)$, where $\tilde{X}^{(\hat{L})}$ represents transmitted pilot OFDM symbols that are cyclically shifted by $\hat{L}$, $\hat{L}$ represents the integer CFO estimate, and Y represents the frequency-domain symbols.

In other features, the integer CFO estimate is based on $$\hat{L} = \underset{l}{\mathrm{argmax}} \left\{ \sum_{k=0}^{N-1} \left| \sum_{m=0}^{M-1} e^{-j2\pi lm\alpha} X_m^*[k-l] Y_m[k] \right|^2 \right\},$$

where l represents an integer CFO, N represents a number of data samples, M represents a number of transmitted pilot OFDM symbols, and α represents a ratio of a number of cyclic prefix samples ($N_g$) to N. The channel estimate can be based on $$\hat{H}[k-\hat{L}] = \frac{\sum_{m=0}^{M-1} e^{-j2\pi \hat{L}m\alpha} X_m^*[k-\hat{L}] Y_m[k]}{M},$$

where $\hat{L}$ represents the integer CFO estimate, M represents a number of transmitted pilot OFDM symbols, α represents a ratio of a number of cyclic prefix samples ($N_g$) to a number of data samples (N), $X_m$ represents the $m^{th}$ transmitted pilot OFDM symbol, $\hat{L}$ represents the integer CFO estimate, $Y_m$ represents the $m^{th}$ frequency-domain symbol, and k represents a subcarrier index.

In other features, the method is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5. The method can include generating second time-domain symbols based on the time-domain symbols, wherein the step of generating the frequency-domain symbols is based on the second time-domain symbols, and wherein a phase of the time-domain symbols is adjusted based on the integer CFO estimate signal.

An Orthogonal Frequency Division Multiplexing (OFDM) receiver is provided that receives a modulated OFDM signal through a channel. The receiver includes RF downconverter means for generating a downconverted modulated OFDM signal based on the modulated OFDM signal, analog-to-digital converter (ADC) means for generating digitized OFDM symbols based on the downconverted modulated OFDM signal, carrier-phase correction means for generating time-domain symbols based on the digitized OFDM symbols, fast Fourier transform (FFT) means for generating frequency-domain symbols based on the time-domain symbols, and estimator means for receiving the frequency-domain symbols and determining an integer carrier frequency offset (CFO) estimate and a channel estimate and for generating respective integer CFO estimate and channel estimate signals.

In other features, the RF downconverter means includes local oscillator means for generating a first frequency based on the integer CFO estimate signal. The carrier-phase correction means can adjust a phase of the time-domain symbols based on the integer CFO estimate signal. The FFT means can adjust a rotation of the frequency-domain symbols based on the integer CFO signal. The OFDM receiver can also include Viterbi decoder means for receiving the frequency-domain symbols and receiving the channel estimate signal.

In other features, the integer CFO estimate is based on $$\hat{L} = \underset{l}{\mathrm{argmax}} \left| \tilde{X}^{(l)*} Y \right|,$$

where l represents an integer CFO, $\tilde{X}^{(l)}$ represents transmitted pilot OFDM symbols that are cyclically shifted by l, and Y represents the frequency-domain symbols. The channel estimate can include a channel phase estimate that is based on $\hat{\Theta} = \angle(\tilde{X}^{(\hat{L})*}Y)$, where $\tilde{X}^{(\hat{L})}$ represents transmitted pilot OFDM symbols that are cyclically shifted by $\hat{L}$, $\hat{L}$ represents the integer CFO estimate, and Y represents the frequency-domain symbols.

In other features, the integer CFO estimate is based on $$\hat{L} = \underset{l}{\mathrm{argmax}} \left\{ \sum_{k=0}^{N-1} \left| \sum_{m=0}^{M-1} e^{-j2\pi lm\alpha} X_m^*[k-l] Y_m[k] \right|^2 \right\},$$

where l represents an integer CFO, N represents a number of data samples, M represents a number of transmitted pilot OFDM symbols, and α represents a ratio of a number of cyclic prefix samples ($N_g$) to N. The channel estimate can be based on $$\hat{\hat{H}}[k-\hat{L}] = \frac{\sum_{m=0}^{M-1} e^{-j2\pi\hat{L}m\alpha} X_m^*[k-\hat{L}]Y_m[k]}{M},$$

where $\hat{L}$ represents the integer CFO estimate, M represents a number of transmitted pilot OFDM symbols, $\alpha$ represents a ratio of a number of cyclic prefix samples ($N_g$) to a number of data samples (N), $X_m$ represents the $m^{th}$ transmitted pilot OFDM symbol, $\hat{L}$ represents the integer CFO estimate, $Y_m$ represents the $m^{th}$ frequency-domain symbol, and k represents a subcarrier index.

In other features, the receiver is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5. The receiver can include cyclic prefix removal means for generating second time-domain symbols based on the time-domain symbols, wherein the FFT means generates the frequency-domain symbols based on the second time-domain symbols, and wherein a phase of the time-domain symbols is adjusted based on the integer CFO estimate signal.

A computer program executed by a processor receives a modulated Orthogonal Frequency Division Multiplexing (OFDM) signal through a channel. The computer program includes generating a downconverted modulated OFDM signal based on the modulated OFDM signal, generating digitized OFDM symbols based on the downconverted modulated OFDM signal, generating time-domain symbols based on the digitized OFDM symbols, generating frequency-domain symbols based on the time-domain symbols, determining an integer carrier frequency offset (CFO) estimate based on the frequency-domain symbols and generating a corresponding CFO estimate signal, and determining a channel estimate based on the frequency-domain symbols and generating a corresponding channel estimate signal.

In other features, the downconverting step includes operating a local oscillator at a first frequency based on the integer CFO estimate signal. The computer program can include adjusting a phase of the time-domain symbols based on the integer CFO estimate signal. The computer program can include adjusting a rotation of the frequency-domain symbols based on the integer CFO signal. The computer program can include applying the frequency-domain symbols and the channel estimate signal to a Viterbi decoding algorithm.

In other features, the integer CFO estimate is based on $$\hat{L} = \underset{l}{\operatorname{argmax}} |\tilde{X}^{(l)*} Y|,$$

where l represents an integer CFO, $\tilde{X}^{(l)}$ represents transmitted pilot OFDM symbols that are cyclically shifted by l, and Y represents the frequency-domain symbols. The channel estimate can include a channel phase estimate that is based on $\hat{\theta} = \angle(\tilde{X}^{(\hat{L})} * Y)$, where $\tilde{X}^{(\hat{L})}$ represents transmitted pilot OFDM symbols that are cyclically shifted by $\hat{L}$, $\hat{L}$ represents the integer CFO estimate, and Y represents the frequency-domain symbols.

In other features, the integer CFO estimate is based on $$\hat{L} = \underset{l}{\operatorname{argmax}} \left\{ \sum_{k=0}^{N-1} \left| \sum_{m=0}^{M-1} e^{-j2\pi lm\alpha} X_m^*[k-l]Y_m[k] \right|^2 \right\},$$

where l represents an integer CFO, N represents a number of data samples, M represents a number of transmitted pilot OFDM symbols, and $\alpha$ represents a ratio of a number of cyclic prefix samples ($N_g$) to N. The channel estimate can be based on $$\hat{\hat{H}}[k-\hat{L}] = \frac{\sum_{m=0}^{M-1} e^{-j2\pi\hat{L}m\alpha} X_m^*[k-\hat{L}]Y_m[k]}{M},$$

where $\hat{L}$ represents the integer CFO estimate, M represents a number of transmitted pilot OFDM symbols, $\alpha$ represents a ratio of a number of cyclic prefix samples ($N_g$) to a number of data samples (N), $X_m$ represents the $m^{th}$ transmitted pilot OFDM symbol, $\hat{L}$ represents the integer CFO estimate, $Y_m$ represents the $m^{th}$ frequency-domain symbol, and k represents a subcarrier index.

In other features, the computer program is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5. The computer program can include generating second time-domain symbols based on the time-domain symbols, wherein the step of generating the frequency-domain symbols is based on the second time-domain symbols, and wherein a phase of the time-domain symbols is adjusted based on the integer CFO estimate signal.

In still other features, the systems and methods described above are implemented by a computer program executed by one or more processors. The computer program can reside on a computer readable medium such as but not limited to memory, non-volatile data storage and/or other suitable tangible storage mediums.

In other features, the systems and methods are implemented in a wireless local area network (WLAN) interface of a high definition television, a cellular phone, a set top box, a media player and/or a vehicle control system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
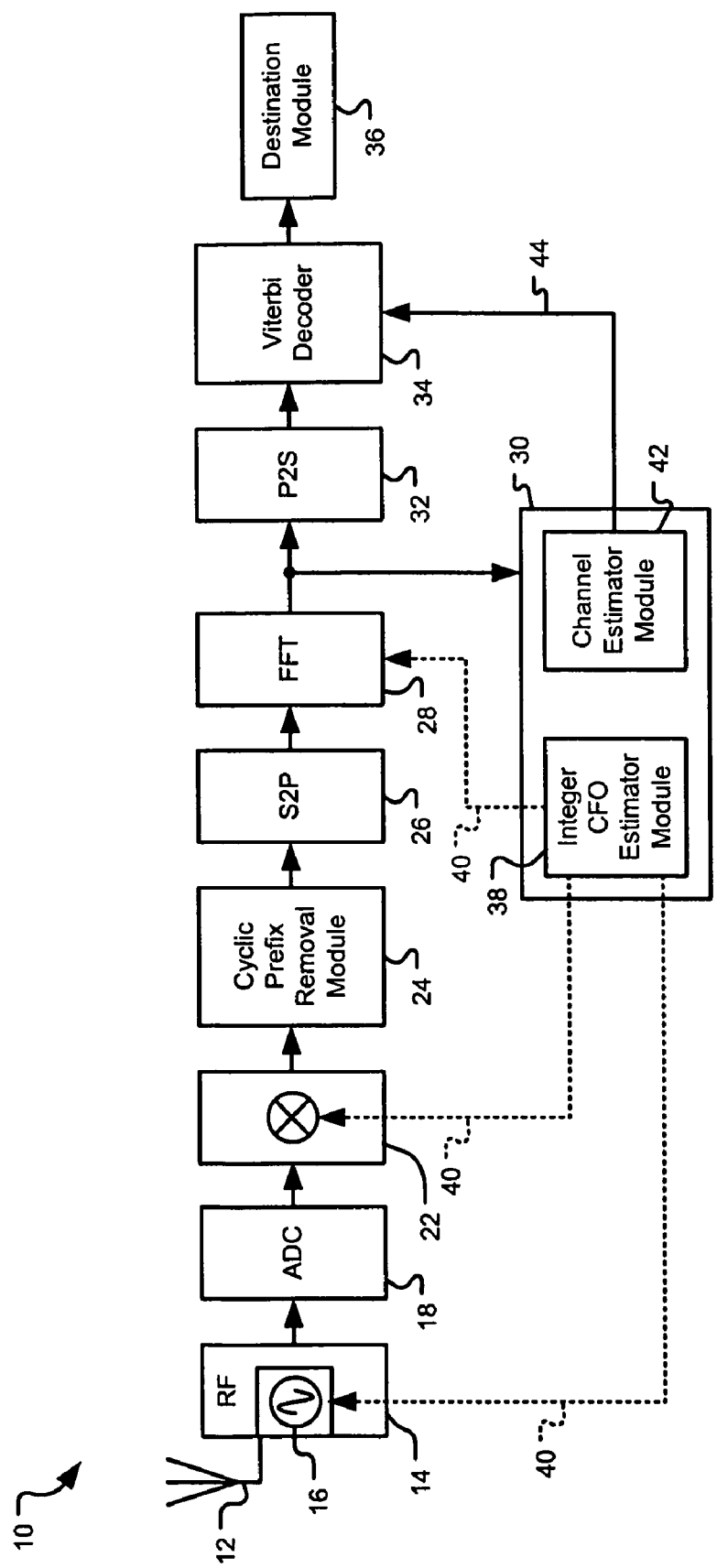
FIG. 1 is a functional block diagram of an OFDM receiver.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group), and memory that execute one or more software or firmware programs, a combinational logic circuit, and/or other suitable components that provide the described functionality.

Normalized CFO can be defined as CFO normalized to a subcarrier bandwidth of an OFDM channel. The normalized CFO can include an integer part and a fractional part. Systems and methods according to the present invention can be used to determine the integer part. The fractional part can be corrected using existing and/or newly discovered techniques.

Referring now to FIG. 1, a functional block diagram is shown of an OFDM receiver 10. The OFDM receiver 10 can be implemented to be compatible with the Institute of Electrical and Electronics Engineers (IEEE) 802.11 standard as amended, including the 802.11a, 802.11g, and 802.11n amendments, which is hereby incorporated by reference in its entirety. The OFDM receiver 10 can also be implemented to be compatible with European Telecommunications Standard Institute (ETSI) Digital Video Broadcasting (DVB), Digital Audio Broadcasting (DAB), and Digital Radio Mondiale (DRM) standards, which are hereby incorporated by reference in their entirety. The OFDM receiver 10 can also be implemented to be compatible with the National Radio Systems Committee (NRSC) In-band/On-channel Digital Radio Broadcasting Standard, NRSC-5, which is hereby incorporated by reference in its entirety.

An antenna 12 receives modulated OFDM symbols and communicates them to an RF downconverter module 14. The RF downconverter module 14 includes a local oscillator 16.

The RF downconverter module 14 communicates downconverted OFDM symbols to an analog-to-digital converter (ADC) module 18. The ADC module 18 communicates digitized OFDM symbols to a carrier-phase correction module 22. The carrier-phase correction module 22 communicates time-domain symbols to a cyclic prefix removal module 24.

The cyclic prefix removal module 24 removes a cyclic prefix that is prepended to the time-domain symbols by a transmitter (not shown). The cyclic prefix removal module 24 communicates the time-domain symbols to a serial-to-parallel converter (S2P) module 26. The S2P module 26 communicates the time-domain symbols to a fast-Fourier transform (FFT) module 28. The FFT module 28 converts the time-domain symbols to the frequency domain.

Outputs of the FFT module 28 communicate the frequency-domain symbols to an estimator module 30 and a parallel-to-serial (P2S) converter module 32. The P2S converter module 32 communicates the frequency-domain symbols to a Viterbi decoder module 34. The Viterbi decoder module 34 decodes the frequency-domain OFDM symbols. The Viterbi decoder module 34 communicates decoded symbols to a destination module 36 that extracts digital data from the decoded symbols.

The estimator module 30 observes the frequency-domain symbols from the FFT module 28. A CFO estimator module 38 determines the integer CFO estimate based on the frequency-domain symbols and generates a integer CFO estimate signal 40. The integer CFO estimate signal 40 can be applied to the RF downconverter module 14 to reduce the CFO. By way of non-limiting example, the integer CFO estimate signal 40 can be used to generate an offset for a frequency of the local oscillator 16 in the RF down-converter module 14. In some embodiments, the integer CFO estimate signal 40 can be used to change the phase of the time-domain symbols in or after the carrier-phase correction module 22 and prior to the cyclic prefix removal module 24. By way of non-limiting example, carrier-phase correction module 22 can receive and use the integer CFO estimate signal 40 to change the phase of the time-domain symbols.

The estimator module 30 also includes a channel estimator module 42. The channel estimator module 42 determines a channel estimate based on the frequency-domain symbols and generates a channel estimate signal 44. The channel estimate signal 44 is communicated to the Viterbi decoder module 34.

In the following sections, a pilot-aided estimation of the integer CFO is described. A maximum likelihood (ML) estimator of the integer CFO is derived for AWGN channels. Section 1 presents a baseband model of an OFDM system affected by CFO and discusses the effect of the integer CFO on the received data. Section 2 derives the joint ML estimator for the AWGN channel, as well as the ML estimator for the integer CFO. Section 3 finds the joint ML estimator for a general multipath channel and presents a simplified approach to the estimation of the integer CFO. Section 4 provides results on the performance of the estimators obtained by simulation.

Section 1

System Model

Figure 2:
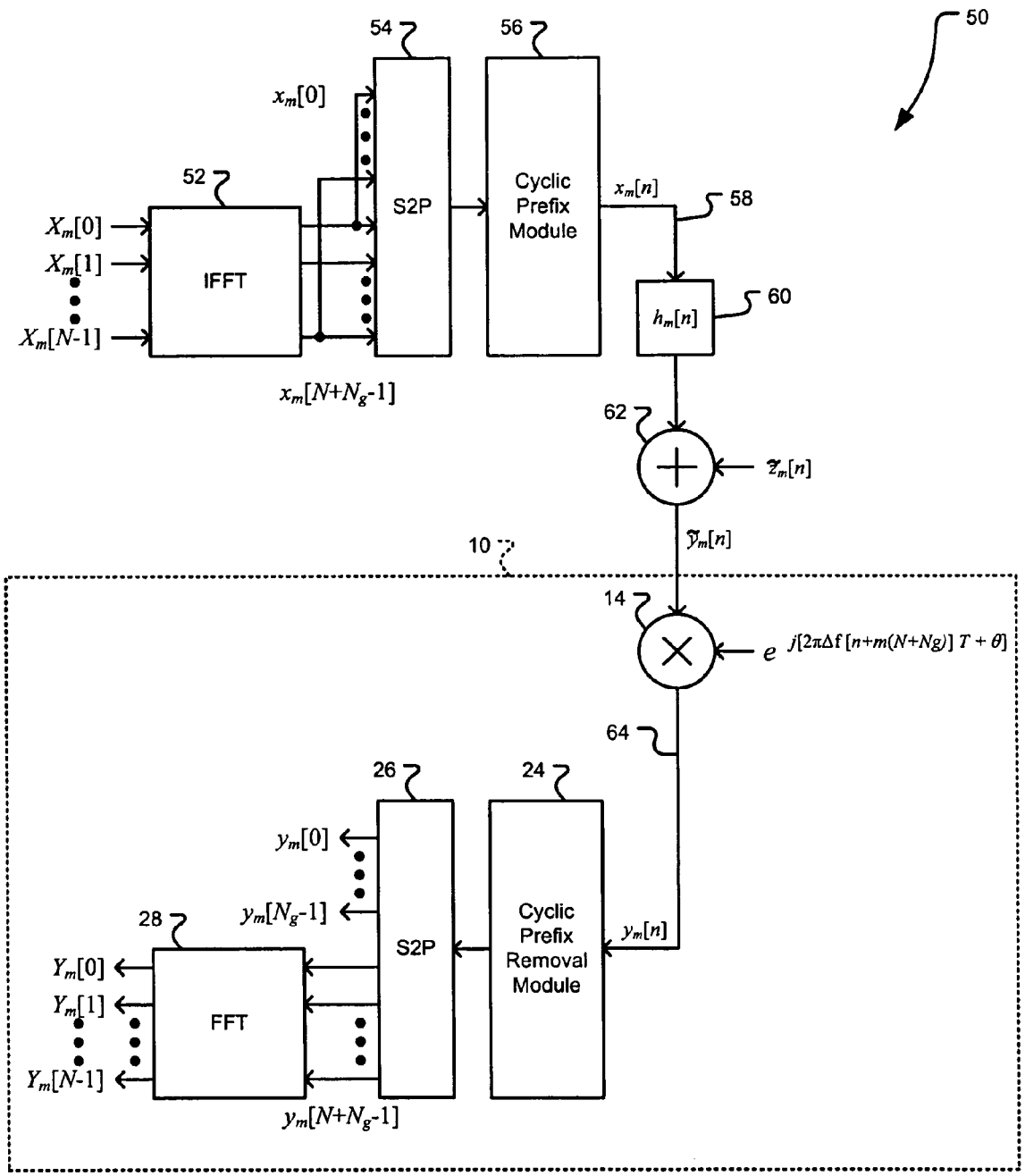
FIG. 2 is a system model of an OFDM communication system and channel.

Referring now to FIG. 2, a baseband equivalent model of an OFDM system 50 is shown. A data source (not shown) communicates information as a series of information symbols $X_m[k]$ for k=0, 1, . . . , N−1. An inverse FFT 52 is performed on the information symbols to produce time-domain samples $x_m[n]$ (at a transmit signal 58) of an OFDM symbol m:

$$x_m[n] = \begin{cases} \frac{1}{N}\sum_{k=0}^{N-1} X_m[k]e^{j2\pi kn/N}, & \text{if } -N_g \leq n \leq N-1 \\ 0, & \text{otherwise,} \end{cases} \quad (1)$$

where N and $N_g$ are the numbers of data samples and cyclic prefix samples, respectively. The OFDM symbol $x_m[n]$ is transmitted through a channel $h_m[n]$ (at 60) over a carrier and is corrupted by Gaussian noise $z_m[n]$ (at 62). The channel $h_m[n]$ is assumed to be block stationary, i.e., time-invariant during each OFDM symbol.

At the RF down-converter module 14, the passband signal is downconverted to baseband. When a local frequency $f_l$ of the local oscillator is not matched to a carrier frequency $f_c$, a carrier frequency offset (CFO) $\Delta f = f_c - f_l$ will appear. In addition, there may also be a phase offset $\theta$. The received symbol $y_m[n]$ (at a received signal 64) can then be represented as $$y_m[n] = e^{j[2\pi\Delta f(n+m(N+N_g))t+\theta]}(h_m[n] * x_m[n]) + z_m[n], \quad (2)$$

where T is the sampling period and $h_m[n] * x_m[n] = \sum_{r=-\infty}^{\infty} h_m[r]x_m[n-r]$. The noise $z_m[n]$ is a zero-mean complex-Gaussian random variable with variance $\sigma_z^2$ and is independent of the transmit signal 58 and the channel 60.

The CFO $\Delta f$ can be represented with respect to a subcarrier bandwidth $1/NT$ by defining the normalized CFO $\epsilon$ as $$\varepsilon \triangleq \frac{\Delta f}{1/NT} = \Delta f NT. \quad (3)$$

With the above definition of the normalized CFO $\epsilon$, the received symbol $y_m[n]$ can be expressed as $$y_m[n] = e^{j\frac{2\pi\varepsilon n}{N}} e^{j2\pi\varepsilon m(1+\alpha)} e^{j\theta}(h_m[n] * x_m[n]) + z_m[n], \quad (4)$$

where $$\alpha = \frac{N_g}{N}.$$

The normalized CFO $\epsilon$ can be divided into the integer part l and the fractional part $\tilde{\epsilon}$ such that $-\frac{1}{2} \leq \tilde{\epsilon} < \frac{1}{2}$:

$$\epsilon = l + \tilde{\epsilon}, \quad (5)$$

where l is an integer.

When the fractional CFO is equal to zero, the FFT of $y_m[n]$ can be expressed as $$Y_m[k] = e^{j(2\pi lm\alpha+\theta)} H_m[k-l]X_m[k-l] + Z_m[k], \quad (6)$$

where $H_m[k]$ and $Z_m[k]$ are the FFT of $h_m[n]$ and $z_m[n]$, respectively. In Eq. (6), it is assumed that $H_m[k]$ and $X_m[k]$ are periodic with period N to simplify the notation. Similarly, $Y_m[k]$ is also assumed to be periodic. As can be seen in Eq. (6), the integer CFO l causes a cyclic shift and a phase change of the received signal 64.

It is assumed that the estimator module 30 observes a pilot sequence of M pilot sequence OFDM symbols for the integer CFO estimation. The pilot sequence can include a constant-amplitude-zero-autocorrelation (CAZAC) of length N. It is also assumed that the channel 60 is time-invariant during the M OFDM symbol interval, i.e., $H_0[k] = \ldots = H_{M-1}[k]$ for all k. This is a reasonable assumption when M is small compared to the channel variation rate. Let $H[k] \triangleq H_m[k]$. Then from Eq. (6), the received signal 64 can be represented in a vector notation as $$\tilde{Y}[k] = e^{j\Theta}H[k-L]\tilde{X}^{(L)}[k] + Z[k], \quad (7)$$

where $$Y[k] = [Y_0[k] \ldots Y_{M-1}[k]]^T, \quad (8)$$

$$\tilde{X}^{(L)}[k] = [X_0[k-L] \ldots e^{j2\pi L(M-1)\alpha}X_{M-1}[k-L]]^T, \quad (9)$$

and $$Z[k] = [Z_0[k] \ldots Z_{M-1}[k]]^T. \quad (10)$$

In the above equations, the integer CFO and the phase offset are expressed as the capital letters L and $\Theta$ to emphasize that they are random variables.

Section 2

Estimation of Integer Frequency Offset and Phase Offset for AWGN Channel

In this section, the estimator of the integer CFO and the phase offset is derived for the channel 60. For the derivations in this section, the channel 60 is modeled as an AWGN channel and is also referred to as the AWGN channel 60.

Subsection 2.1

Approximate ML Estimator of L

When the estimation of the phase offset is not necessary, the integer CFO can be estimated after removing the phase offset with the multiplication of $Y_{m-1}^*[k]$ and $Y_m[k]$ as described in J. Lee, H. Lou, and D. Toumpakaris, "Approximate maximum likelihood estimation of integer carrier frequency offset," in *Proc. IEEE ICC* 2005, 2005, which is hereby incorporated by reference.

Let $V_m[k] = Y_{m-1}^*[k]Y_m[k]$. Then, from Eq. (6), $$V_m[k] = e^{j2\pi L\alpha}U_m[k-L] + Z_m'[k], \quad (11)$$

where $U_m[k] = X_{m-1}^*[k]X_m[k]$ and $Z_m'[k]$ is a noise that approximately follows a Gaussian distribution for high signal-to-noise ratio (SNR). Assuming that the observation is $V_m[k]$ for $m=1, \ldots, M-1$ and $k=0, \ldots, N-1$, an approximate ML estimate of the integer CFO is given by $$\hat{L} = \underset{l}{\mathrm{argmax}}\left\{\Re\left\{e^{-j2\pi l\alpha}\sum_{m=0}^{M-1}\sum_{k=0}^{N-1}V_m[k+l]U_m^*[k]\right\}\right\} \quad (12)$$

where $\Re\{x\}$ denotes the real part of x.

In C. Chen J. Li, and L. Zhao, "Comparison of integer frequency offset estimators for OFDM systems," in *Proc. IEEE GLOBECOM* 2004, 2004, which is hereby incorporated by reference, the estimator of Eq. (12) was derived as the solution to an ML estimation problem. However, Eq. (12) is an ML estimator only when $X_m[k]$ follows a Gaussian distribution, which may not be the case for practical OFDM systems.

Subsection 2.2

ML Estimator of L

Figure 3:
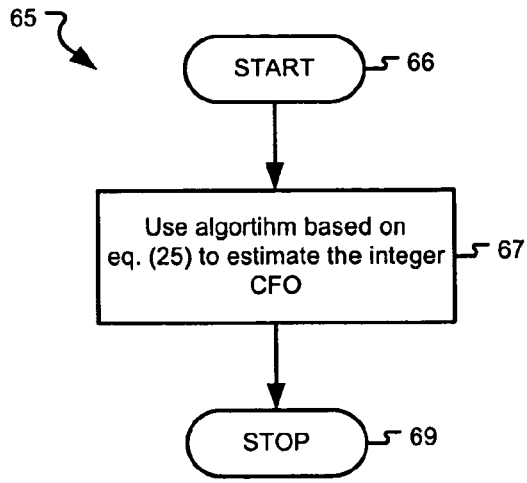
FIG. 3 is a flow chart of a method for estimating an integer CFO for an additive Gaussian white noise (AWGN) channel.

Referring now to FIG. 3, a method 65 is provided for determining the CFO estimate and its associated CFO estimate signal 40. The method 65 can be executed by the CFO estimator module 38. The method 65 starts in block 66. Control then proceeds to block 67 and estimates the integer CFO in accordance with an expression derived below.

The exact ML estimator of the integer CFO is derived when the estimation of the phase offset is not necessary. For the AWGN channel 60, $$H[k]=1, \text{ for all } k. \tag{13}$$

From Eq. (7), the received signal 64 for each subcarrier k can be represented as $$Y[k]=e^{j\Theta}\tilde{X}^{(L)}[k]+Z[k]. \tag{14}$$

In a more compact form, the received signal 64 can be expressed as $$Y=e^{j\Theta}\tilde{X}^{(L)}+Z, \tag{15}$$

where $$Y=[Y[0]^T \ldots Y[N-1]^T]^T, \tag{16}$$

$$\tilde{X}^{(L)}=[\tilde{X}^{(L)}[0]^T \ldots \tilde{X}^{(L)}[N-1]^T]^T, \tag{17}$$

and $$Z=[Z[0]^T \ldots Z[N-1]^T]^T. \tag{18}$$

The ML estimate of the integer CFO L given the observation of Y is $$\hat{L} = \underset{l}{\operatorname{argmax}} f(Y \mid l). \tag{19}$$

A probability density function (pdf) of Y conditioned on L=l can be computed as follows:

$$f(Y|l)=\int_0^{2\pi} f(Y|l,\theta) f_\Theta(\theta) d\theta, \tag{20}$$

where $f(Y|l,\theta)$ is the pdf of Y conditioned on L=l and $\Theta=\theta$, and $f_\Theta(\theta)$ is the pdf of $\Theta$. It is assumed that the phase offset $\Theta$ is uniformly distributed in $[0,2\pi]$:

$$f_\Theta(\theta) = \begin{cases} \frac{1}{2\pi} & 0 \leq \theta \leq 2\pi \\ 0 & \text{otherwise} \end{cases}. \tag{21}$$

The pdf of Y conditioned on L=l and $\Theta=\theta$ is $$f(Y \mid l, \theta) = \frac{1}{(\pi\sigma_Z^2)^{MN}} \exp\left(-\frac{\|Y-e^{j\theta}\tilde{X}^{(l)}\|^2}{\sigma_Z^2}\right) \tag{22}$$

-continued $$= \frac{1}{(\pi\sigma_Z^2)^{MN}} \exp\left(-\frac{\|Y\|^2+\|\tilde{X}^{(l)}\|^2}{\sigma_Z^2}\right) \cdot \exp\left(\frac{2\Re\{e^{-j\theta}\tilde{X}^{(l)*}Y\}}{\sigma_Z^2}\right),$$

where $\Re\{x\}$ denotes the real part of x. Then, from Eq. (20), it can be shown that the pdf of Y conditioned on L=l is $$f(Y \mid l) = \frac{1}{(\pi\sigma_Z^2)^{MN}} \exp\left(-\frac{\|Y\|^2+\|\tilde{X}^{(l)}\|^2}{\sigma_Z^2}\right) \cdot I_0\left(\frac{2|\tilde{X}^{(l)*}Y|}{\sigma_Z^2}\right), \tag{23}$$

where $I_0(x)$ is the modified Bessel function of zero order:

$$I_0(x) = \frac{1}{2\pi}\int_{-\pi}^{\pi} e^{x\cos(\theta)} d\theta. \tag{24}$$

Since $\|\tilde{X}^{(l)}\|$ does not depend on l and $I_0(x)$ is a monotonically increasing function, the ML estimate of the integer CFO L becomes $$\hat{L} = \underset{l}{\operatorname{argmax}}|\tilde{X}^{(l)*}Y|. \tag{25}$$

Returning to FIG. 3 at block 67, control determines the integer CFO and the integer CFO estimate signal 40 based on Eq. (25). Control then proceeds to block 69 and terminates.

Subsection 2.3

Joint ML Estimator of L and $\Theta$

Figure 4:
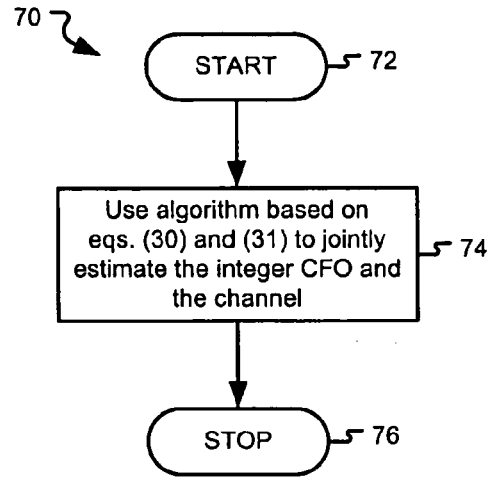
FIG. 4 is a flow chart of a method for jointly estimating an integer CFO and channel for an additive Gaussian white noise (AWGN) channel.

Referring now to FIG. 4, a method 70 is provided to jointly determine the CFO estimate and the channel, and the CFO estimate signal 40 and channel estimate signal 44, respectively. The method 70 can be executed by the CFO estimator module 38 and/or the channel estimator module 42. The method 70 starts in block 72. Control then proceeds to block 74 and jointly estimates the integer CFO and the channel in accordance with the following derivation.

The joint ML estimator of the integer CFO and the phase offset is now derived for the AWGN channel 60. The joint ML estimate of the integer CFO L and the phase offset $\Theta$ is $$(\hat{L}, \hat{\Theta}) = \underset{(l,\theta)}{\operatorname{argmax}} f(Y \mid l, \theta). \tag{26}$$

From Eq. (22), it can be shown that maximizing $f(Y|l,\theta)$ is equivalent to maximizing $$g(l,\theta)=\Re\{e^{-j\theta}\tilde{X}^{(l)*}Y\}. \tag{27}$$

Note that $$\max_{(l,\theta)} g(l,\theta) = \max_l \max_\theta g(l,\theta). \tag{28}$$

Thus, the joint estimate of L and Θ can be found by first finding θ that maximizes g(l,θ) for each possible value of l and then finding l that maximizes g(l,θ) with θ found in the first step. From Eq. (27), θ that maximizes g(l,θ) for each l is $$\theta_{max} = \measuredangle(\tilde{X}^{(l)*}Y), \quad (29)$$

and $g(l,\theta_{max}) = |\tilde{X}^{(l)*}Y|$. Thus, $$\hat{L} = \underset{l}{\mathrm{argmax}}|\tilde{X}^{(l)*}Y|, \quad (30)$$

and $$\hat{\Theta} = \measuredangle(\tilde{X}^{(\hat{L})*}Y). \quad (31)$$

By comparing Eqs. (25) and (30), it can be seen that the estimation of L is the same regardless of whether Θ is jointly estimated or not.

Returning to FIG. 4 at block 74, control determines the integer CFO and the integer CFO estimate signal 40 based on Eq. (30). Control also determines the channel and the channel estimate signal 44 based on Eq. (31). Control then proceeds to block 76 and terminates.

Section 3

Estimation of Integer Frequency Offset and Channel for Multipath Fading Channel

In this section, two estimators of the integer CFO and the channel are developed for the channel 60. In this section the channel 60 is modeled as a multipath fading channel. With this model, the channel 60 is also referred to as the multipath fading channel 60.

The first derived estimator is a simple two-step estimator. The second derived estimator is the joint ML estimator. With the multipath fading channel 60, overall channel gain $\tilde{H}[k] \triangleq e^{j\Theta}H[k]$ is estimated instead of the channel gain and the phase offset. Even though the phase offset Θ is not estimated separately from the phase of the channel 60, there is no performance loss in the receiver 10 since the receiver 10 only needs the combined channel gain.

Subsection 3.1

Simple Estimator of L and $\tilde{H}[k]$

Figure 5:
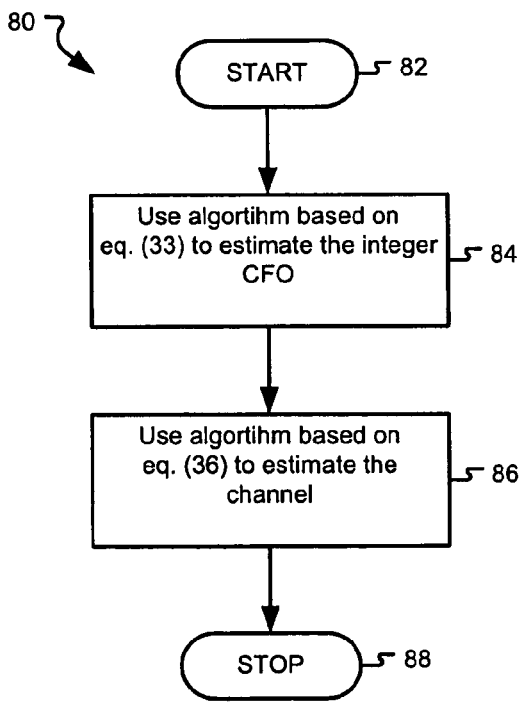
FIG. 5 is a flow chart of a method for estimating an integer CFO and channel for a multipath fading channel.

Referring now to FIG. 5, a method 80 is provided to determine the CFO estimate and the channel, and the CFO estimate signal 40 and channel estimate signal 44, respectively. The method 80 can be executed by the CFO estimator module 38 and/or the channel estimator module 42. The method 80 starts in block 82. Control then proceeds to block 84 and estimates the integer CFO. Control then proceeds to block 86 and estimates the channel. Control makes the estimations of blocks 84 and 86 in accordance with the following derivations.

A simple two-step estimator of the integer CFO and the channel is now developed for the multipath fading channel 60. In terms of the overall channel gain $\tilde{H}[k]$, the received signal 64 can be expressed as $$Y[k] = \tilde{H}[k-L]X^{(L)}[k] + Z[k]. \quad (32)$$

With this model, one simple estimator of the integer CFO is the estimator in Subsection 2.1. The estimator of Subsection 2.1 was originally developed for the AWGN channel 60, but it was also proposed that it be employed for multipath fading channels in M. Morelli, A. N. D'Andrea, and U. Mengali, "Frequency ambiguity resolution in OFDM systems," *IEEE Commun. Left.*, vol. 4, pp. 134-136, April 2000, and J. Lee, H. Lou, and D. Toumpakaris, "Approximate maximum likelihood estimation of integer carrier frequency offset," in *Proc. IEEE ICC 2005*, 2005, which are hereby incorporated by reference in their entirety. Using this approach, the integer CFO estimate for multipath fading channels is $$\hat{L} = \underset{l}{\mathrm{argmax}}\left\{\Re\left\{e^{-j2\pi l\alpha}\sum_{m=0}^{M-1}\sum_{k=0}^{N-1}V_m[k+l]U_m^*[k]\right\}\right\} \quad (33)$$

where $V_m[k] = Y_m[k]Y_{m-1}^*[k]$,
$U_m[k] = X_m[k]X_{m-1}^*[k]$, and
$\Re\{x\}$ denotes the real part of x.

Control estimates the integer CFO based on Eq. (33) and then proceeds to block 86.

Assuming that the resulting integer CFO estimate $\hat{L}$ is correct, the channel 60 can then be estimated by solving the following least-squares problem for each k:

$$Y[k] = \tilde{H}[k-\hat{L}]X^{(\hat{L})}[k]. \quad (34)$$

The least-squares solution is $$\hat{\tilde{H}}[k-\hat{L}] = \frac{\tilde{X}^{(\hat{L})}[k]^* Y[k]}{\|\tilde{X}^{(\hat{L})}[k]\|^2}. \quad (35)$$

For a special case when $|X_m[k]|^2 = 1$ for all m and k, the channel 60 can be estimated by $$\hat{\tilde{H}}[k-\hat{L}] = \frac{\sum_{m=0}^{M-1}e^{-j2\pi \hat{L}m\alpha}Y_m[k]X_m^*[k-\hat{L}]}{M}. \quad (36)$$

Control estimates the channel based on Eq. (36) and then terminates in block 88.

Subsection 3.2

Joint ML Estimator of L and $\tilde{H}[k]$

Figure 6:
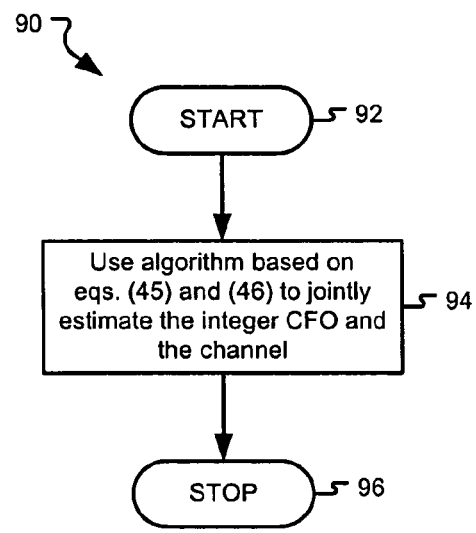
FIG. 6 is a flow chart of a method for jointly estimating an integer CFO and channel for a multipath fading channel.

Referring now to FIG. 6, a method 90 is provided to jointly determine the CFO estimate and the channel, and the CFO estimate signal 40 and channel estimate signal 44, respectively. The method 90 can be executed by the CFO estimator module 38 and/or the channel estimator module 42. The method 90 starts in block 92. Control then proceeds to block 94 and jointly estimates the integer CFO and the channel in accordance with the following derivation.

The joint ML estimate of the integer CFO L and the channel gain $\tilde{H}=[\tilde{H}[0] \ldots \tilde{H}[N-1]]^T$ is $$(\hat{L}, \hat{\tilde{H}}) = \underset{(l,\tilde{H})}{\operatorname{argmax}} f(Y \mid l, \tilde{H}), \quad (37)$$

where $f(Y|l,\tilde{H})$ is the pdf of Y conditioned on L and $\tilde{H}$:

$$f(Y \mid l, \tilde{H}) = \frac{1}{(\pi\sigma_Z^2)^{MN}} \cdot \exp\left(-\frac{\sum_{k=0}^{N-1}\left\|Y[k]-\tilde{H}[k-l]\tilde{X}^{(L)}[k]\right\|^2}{\sigma_Z^2}\right). \quad (38)$$

Thus, maximizing $f(Y|l,\tilde{H})$ is equivalent to minimizing $$g(l, \tilde{H}) = \sum_{k=0}^{N-1}\left\|Y[k]-\tilde{H}[k-l]\tilde{X}^{(l)}[k]\right\|^2. \quad (39)$$

Note that $$\min_{(l,\tilde{H})} g(l, \tilde{H}) = \min_{l} \min_{\tilde{H}} g(l, \tilde{H}). \quad (40)$$

Finding $\tilde{H}$ that minimizes $g(l,\tilde{H})$ for a given l is the same least-squares problem as in Subsection 3.1. Thus, the least-squares solution is $$\hat{\tilde{H}}[k-l] = \frac{\tilde{X}^{(l)}[k]^* Y[k]}{\left\|\tilde{X}^{(l)}[k]\right\|^2}. \quad (41)$$

Then the integer CFO estimate becomes $$\hat{L} = \underset{l}{\operatorname{argmin}}\left\{\sum_{k=0}^{N-1}\left\|Y[k]-\frac{\tilde{X}^{(l)}[k]^* Y[k]}{\left\|\tilde{X}^{(l)}[k]\right\|^2}\tilde{X}^{(l)}[k]\right\|^2\right\}. \quad (42)$$

Simplifying Eq. (42), the integer CFO estimate can be expressed as $$\hat{L} = \underset{l}{\operatorname{argmax}}\left\{\sum_{k=0}^{N-1} \frac{\left|\tilde{X}^{(l)}[k]^* Y[k]\right|^2}{\left\|\tilde{X}^{(l)}[k]\right\|^2}\right\}, \quad (43)$$

while the estimate of the channel 60 is $$\hat{\tilde{H}}[k-\hat{L}] = \frac{\tilde{X}^{(\hat{L})}[k]^* Y[k]}{\left\|\hat{X}^{(\hat{L})}[k]\right\|^2}. \quad (44)$$

For the special case when $|X_m[k]|^2=1$ for all m and k, the integer CFO estimate can be represented as $$\hat{L} = \underset{l}{\operatorname{argmax}}\left\{\sum_{k=0}^{N-1}\left|\sum_{m=0}^{M-1} e^{-j2\pi i m\alpha} X_m^*[k-l] Y_m[k]\right|^2\right\}, \quad (45)$$

and the channel estimate can be expressed as $$\hat{\tilde{H}}[k-\hat{L}] = \frac{\sum_{m=0}^{M-1} e^{-j2\pi \hat{L}m\alpha} X_m^*[k-\hat{L}] Y_m[k]}{M}, \quad (46)$$

which is the same expression as Eq. (36) except for the fact that L can be different. When M=2, the estimator Eq. (45) of the integer CFO also becomes equivalent to the simple estimator Eq. (33) of the integer CFO.

At block 94, control determines the integer CFO and the integer CFO estimate signal 40 based on Eq. (45). Control also determines the channel and the integer channel estimate signal 44 based on Eq. (46). Control then proceeds to block 96 and terminates.

Section 4

Simulation Results

In this section, performance of the ML estimators is evaluated by Monte Carlo simulation. In the simulation, the number N of data samples and the number $N_g$ of cyclic prefix samples in one OFDM symbol are 16 and 3, respectively, resulting in the cyclic prefix width ratio $\alpha$ of $N_g N=3/16$. The maximum magnitude of the integer CFO is chosen as 4. In order to maximize the performance of the integer frequency offset estimator, the pilot sequence is chosen to be a (CAZAC) sequence of length N. Cases are examined for the channel 60 under the AWGN model and the multipath fading model. For the case of the multipath fading channel 60, the channel 60 has an exponential power delay profile with the root mean square (rms) delay chosen to be 2, and each channel tap experiences Rayleigh fading.

Figure 7:
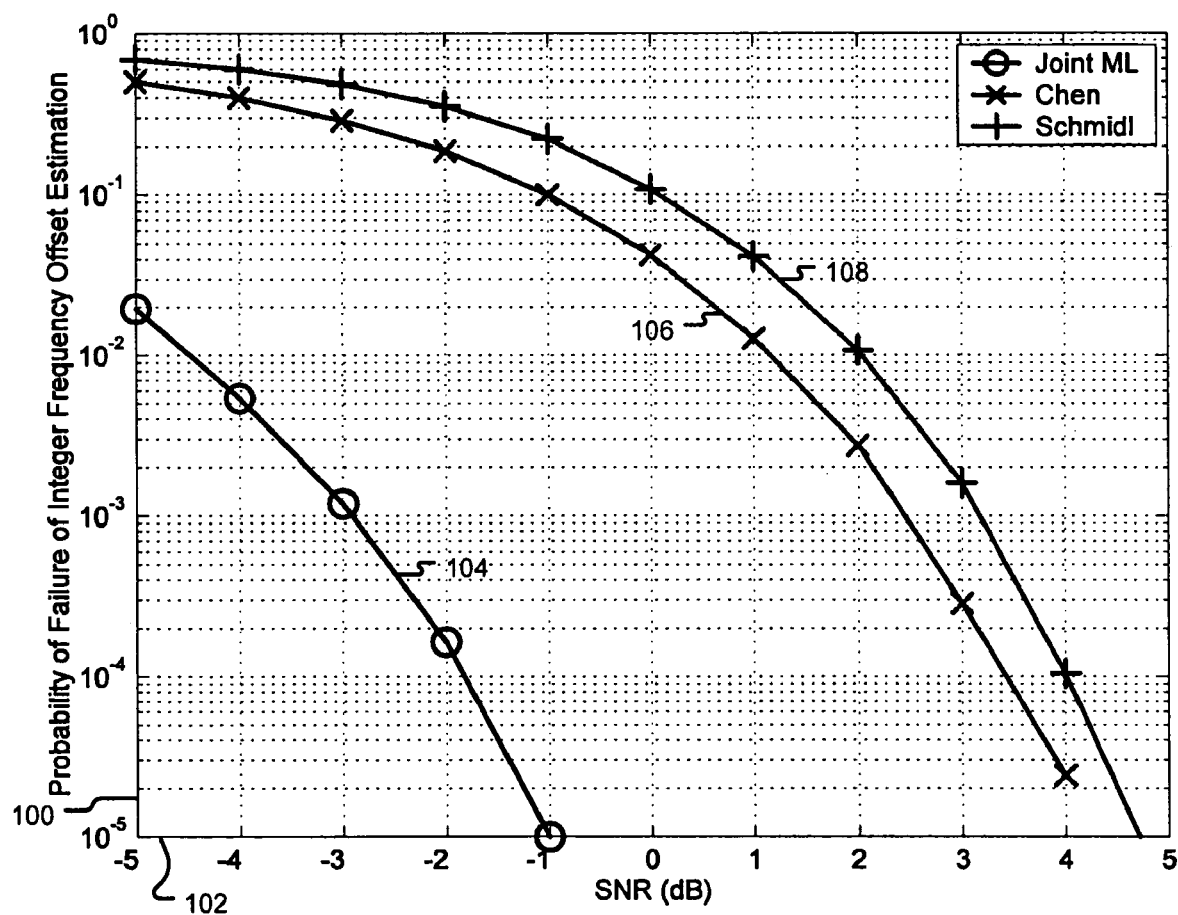
FIG. 7 is a plot of probabilities of failure of integer CFO estimations using various methods for an AWGN channel.

Referring now to FIG. 7, a probability of failure is shown for integer CFO determination for the AWGN channel 60 using an ML estimator based on Eq. (25), the estimator described by Chen et al. "Comparison of integer frequency offset estimators for OFDM systems", and the estimator described in T. M. Schmidl and D. C. Cox, "Robust frequency and timing synchronization for OFDM," *IEEE Trans. Commun.*, vol. 45, pp. 1613-1621, December 1997, which is hereby incorporated by reference in its entirety.

A vertical axis 100 represents the probability of failure of the integer frequency offset estimation. A failure occurs when the estimate of the integer CFO is different from the actual value. A horizontal axis 102 represents the SNR. A curve 104 represents the simulation results for the ML estimator based on Eq. (25). A curve 106 represents the simulation results for the estimator described by Schmidl et al. A curve 108 represents the simulation results for the estimator described by Chen et al. As FIG. 7 shows, the ML estimator based on Eq. (25) performs significantly better than the other two estimators represented by the curves 106 and 108.

Figure 8:
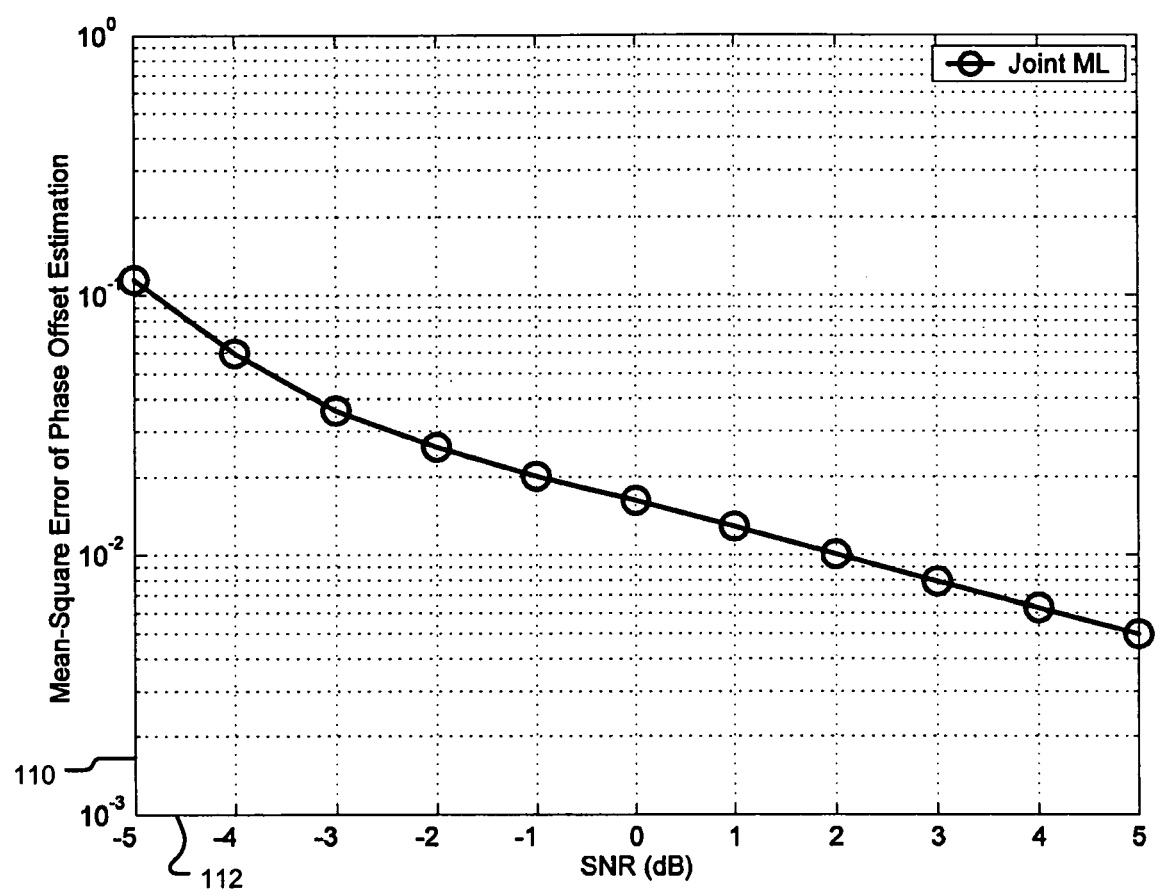
FIG. 8 is a plot of mean square errors of phase offset estimates for an AWGN channel.

Referring now to FIG. 8, a plot is shown of the mean-square error (MSE) of the phase offset estimate, i.e., $E[(\hat{\Theta}-\Theta)^2]$, when the joint ML estimator based on Eqs. (30, 31) is used for the AWGN channel. A vertical axis 110 represents the mean-square error of the phase offset estimation. A horizontal axis 112 represents the SNR. As expected, the mean square error decreases as the SNR increases.

Figure 9:
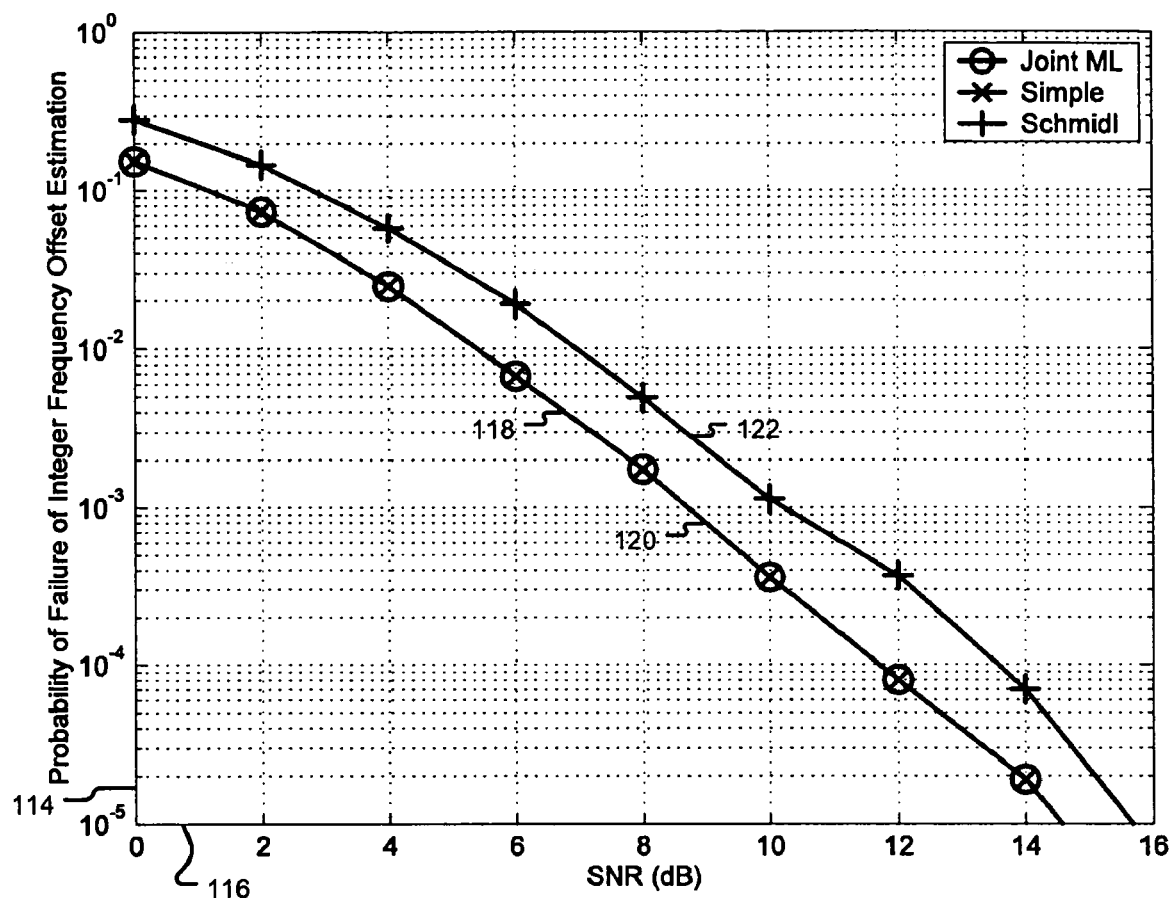
FIG. 9 is a plot of probabilities of failure of integer CFO estimations using various methods for a multipath fading channel.

Referring now to FIG. 9, probabilities of failure are shown of integer CFO estimators based on Eq. (45), Eq. (33), and Schmidl et al., for the multipath fading channels described at the beginning of this section.

A vertical axis 114 represents the probability of failure of the integer frequency offset estimation. A horizontal axis 116 represents the SNR. A curve 118 represents the simulation results for the ML estimator based on Eq. (45). A curve 120 represents the simulation results for the ML estimator based on Eq. (33). A curve 122 represents the simulation results for the estimator described by Schmidl et al. As FIG. 9 shows, the ML estimators based on Eqs. (45) and (33) perform better than the estimator described by Schmidl et al.

Figure 10:
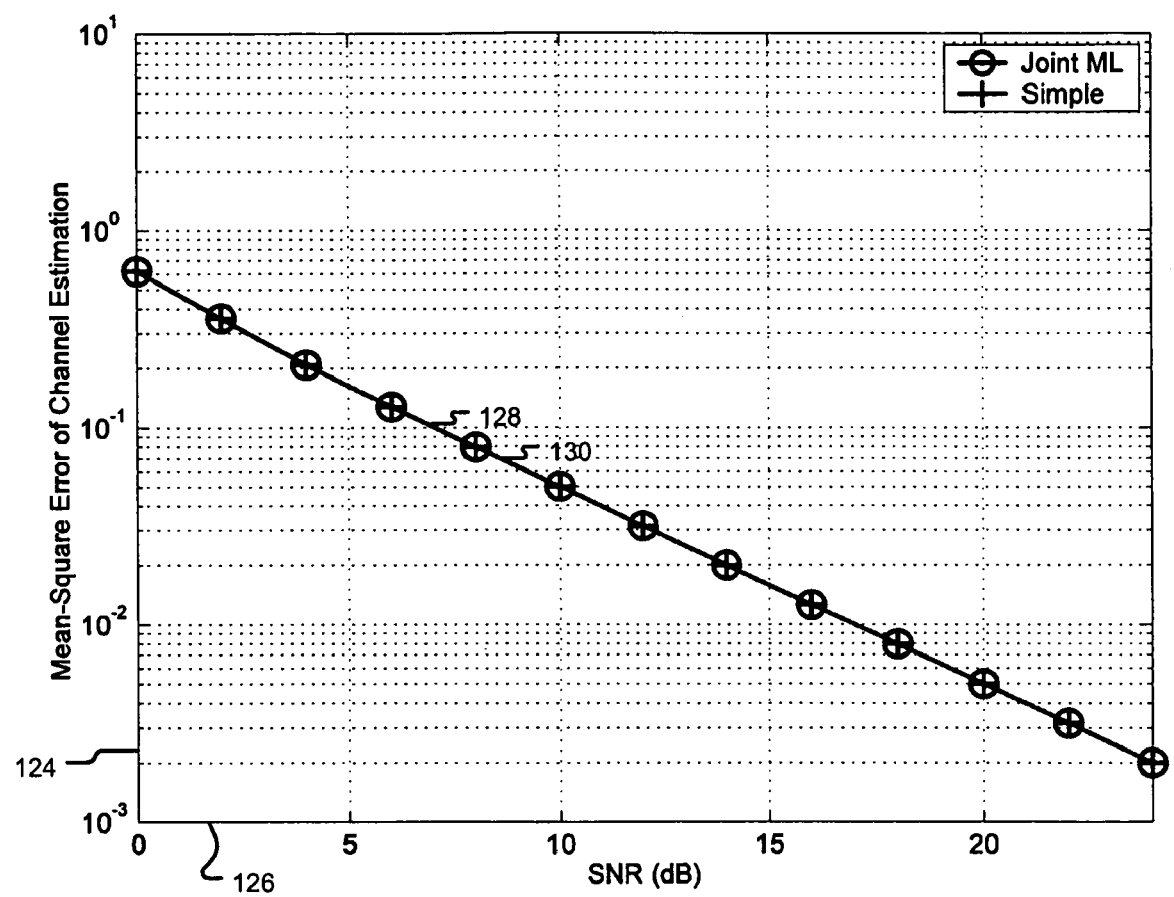
FIG. 10 is a plot of mean square errors of channel estimates for a multipath fading channel.

Referring now to FIG. 10, a plot is shown of the mean-square error (MSE) of the channel estimate, i.e., $\Sigma_{k=0}^{N-1} E[(\hat{H}[k]-\tilde{H}[k])^2]$ for the multipath fading channel 60. Since the CAZAC sequence was chosen as a pilot sequence, $X_m[k]$ has constant magnitude for all m and k. Moreover, it is assumed that two OFDM symbols are observed for the estimation of the integer CFO and the channel gains.

A vertical axis 124 represents the mean-square error of channel estimation. A horizontal axis 126 represents the SNR. A curve 128 represents simulation results for the ML estimator based on Eq. (45). A curve 130 represents simulation results for the ML estimator based on Eq. (33). As can be seen from FIG. 10, the ML estimators based on Eq. (45) and Eq. (33) have the same performance.

Figure 11A:
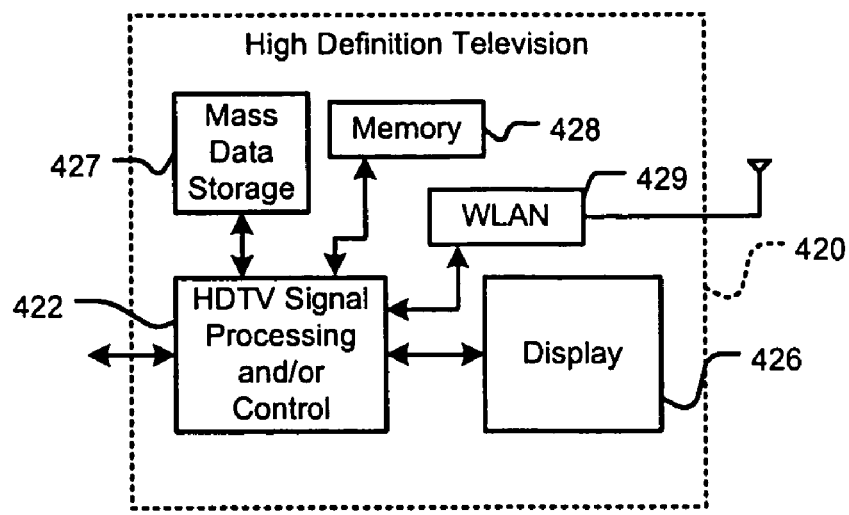
FIG. 11A is a functional block diagram of a wireless local area network (WLAN) interface in a high definition television.

Referring now to FIGS. 11A-11E, various exemplary implementations of the present invention are shown. Referring now to FIG. 11A, the present invention can be implemented in a high definition television (HDTV) 420. The present invention may implement a WLAN interface of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 11B:
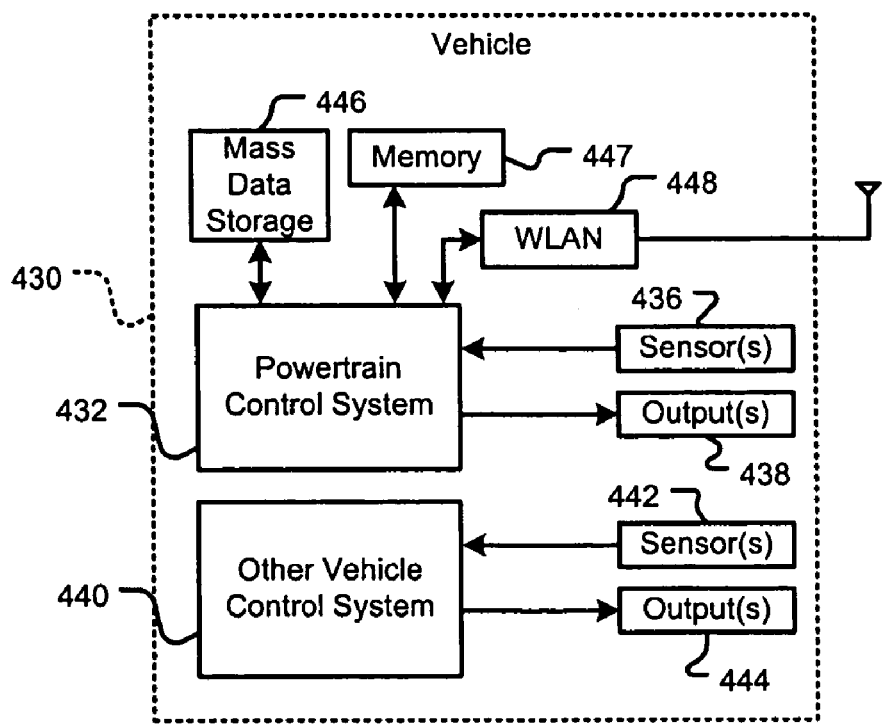
FIG. 11B is a functional block diagram of a WLAN interface in a vehicle control system.

Referring now to FIG. 11B, the present invention implements a WLAN interface of a vehicle control system. In some implementations, the present invention implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 11C:
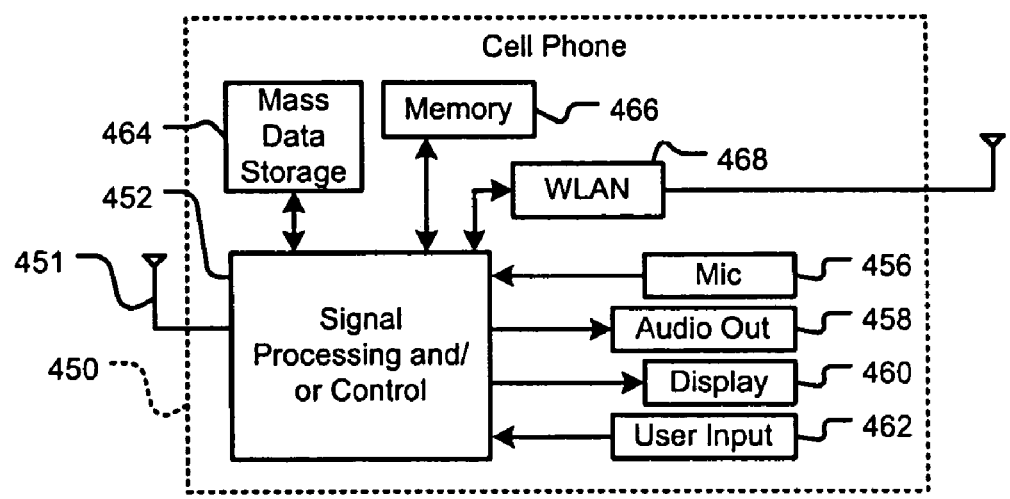
FIG. 11C is a functional block diagram of a WLAN interface in a cellular phone.

Referring now to FIG. 11C, the present invention can be implemented in a cellular phone 450 that may include a cellular antenna 451. The present invention may implement a WLAN interface of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 11D:
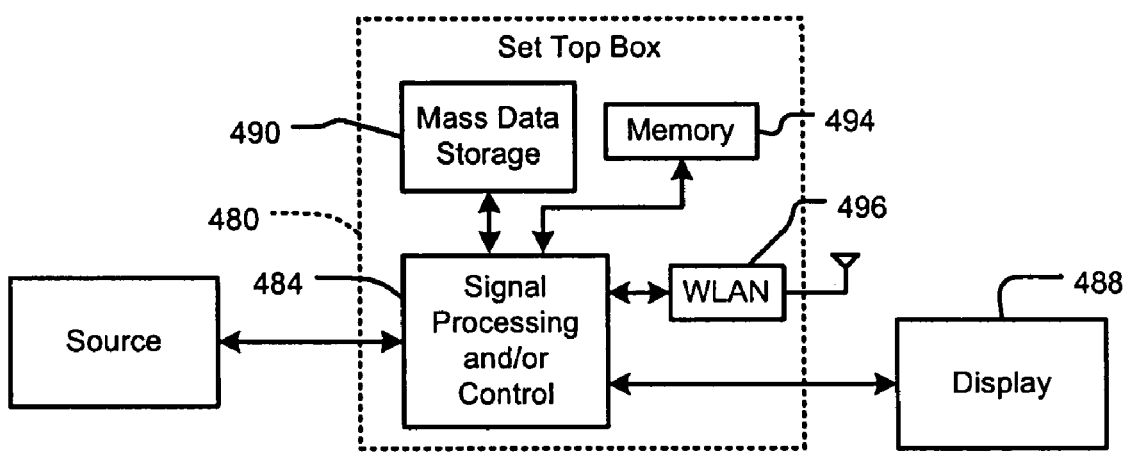
FIG. 11D is a functional block diagram of a WLAN interface in a set top box.

Referring now to FIG. 11D, the present invention can be implemented in a set top box 480. The present invention may implement a WLAN interface of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 11E:
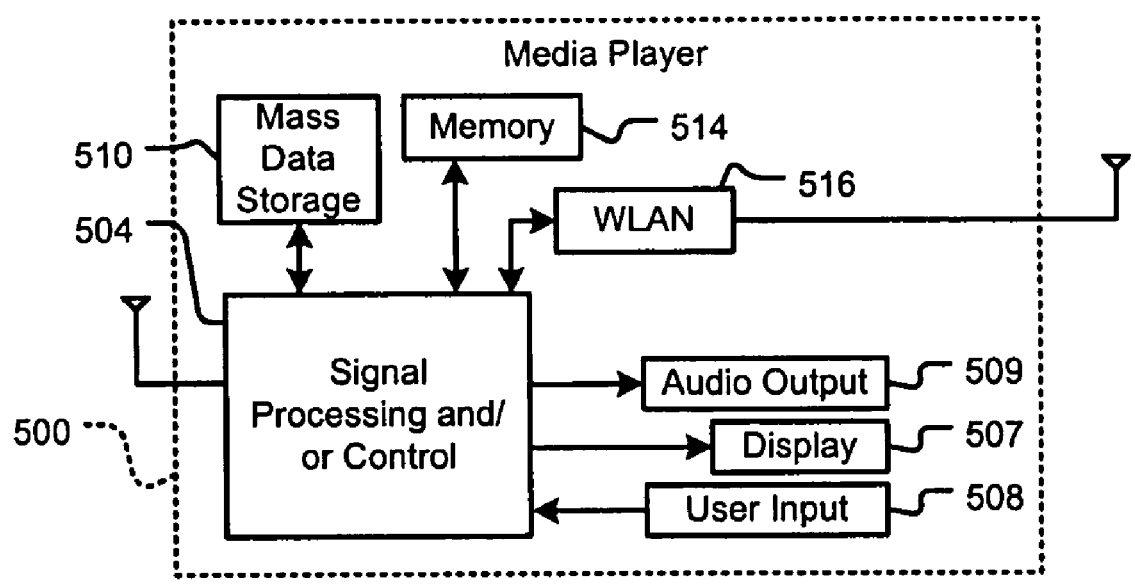
FIG. 11E is a functional block diagram of a WLAN interface in a media player.

Referring now to FIG. 11E, the present invention can be implemented in a media player 500. The present invention may implement a WLAN interface of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An Orthogonal Frequency Division Multiplexing (OFDM) receiver that receives a modulated OFDM signal through a channel, the OFDM receiver comprising:
   an RF downconverter that generates a downconverted modulated OFDM signal based on the modulated OFDM signal;
   an analog-to-digital converter (ADC) that generates digitized OFDM symbols based on the downconverted modulated OFDM signal;
   a carrier-phase correction module that generates time-domain symbols based on the digitized OFDM symbols;
   a fast Fourier transform (FFT) module that generates frequency-domain symbols based on the time-domain symbols; and
   an estimator module that receives the frequency-domain symbols and determines an integer carrier frequency offset (CFO) estimate and a channel estimate, and that generates a respective integer CFO estimate signal and channel estimate signal.

2. The OFDM receiver of claim 1 wherein the RF downconverter includes a local oscillator that operates at a first frequency based on the integer CFO estimate signal.

3. The OFDM receiver of claim 1 wherein the carrier-phase correction module adjusts a phase of the time-domain symbols based on the integer CFO estimate signal.

4. The OFDM receiver of claim 1 wherein the FFT module adjusts a rotation of the frequency-domain symbols based on the integer CFO signal.

5. The OFDM receiver of claim 1 further comprising:
   a Viterbi decoder module that receives the frequency-domain symbols and that receives the channel estimate signal.

6. The OFDM receiver of claim 1 wherein the integer CFO estimate is based on $$\hat{L} = \underset{l}{\mathrm{argmax}} |\tilde{X}^{(l)*} Y|,$$

where l represents an integer CFO, $\tilde{X}^{(l)}$ represents transmitted pilot OFDM symbols that are cyclically shifted by l, and Y represents the frequency-domain symbols.

7. The OFDM receiver of claim 1 wherein the channel estimate includes a channel phase estimate that is based on $\hat{\Theta} = \angle(\tilde{X}^{(\hat{L})*} Y)$, where $\tilde{X}^{(\hat{L})}$ represents transmitted pilot OFDM symbols that are cyclically shifted by $\hat{L}$, $\hat{L}$ represents the integer CFO estimate, and Y represents the frequency-domain symbols.

8. The OFDM receiver of claim 1 wherein the integer CFO estimate is based on $$\hat{L} = \underset{l}{\mathrm{argmax}} \left\{ \sum_{k=0}^{N-1} \left| \sum_{m=0}^{M-1} e^{-j2\pi l m \alpha} X_m^*[k-l] Y_m[k] \right|^2 \right\},$$

where l represents an integer CFO, N represents a number of data samples, M represents a number of transmitted pilot OFDM symbols, and α represents a ratio of a number of cyclic prefix samples ($N_g$) to N.

9. The OFDM receiver of claim 1 wherein the channel estimate is based on $$\hat{H}[k - \hat{L}] = \frac{\sum_{m=0}^{M-1} e^{-j2\pi \hat{L} m \alpha} X_m^*[k - \hat{L}] Y_m[k]}{M},$$

where $\hat{L}$ represents the integer CFO estimate, M represents a number of transmitted pilot OFDM symbols, α represents a ratio of a number of cyclic prefix samples ($N_g$) to a number of data samples (N), $X_m$ represents the $m^{th}$ transmitted pilot OFDM symbol, $\hat{L}$ represents the integer CFO estimate, $Y_m$ represents the $m^{th}$ frequency-domain symbol, and k represents a subcarrier index.

10. The OFDM receiver of claim 1 wherein the receiver is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

11. The OFDM receiver of claim 1 further comprising a cyclic prefix removal module that generates second time-domain symbols based on the time-domain symbols;
   wherein the FFT module generates the frequency-domain symbols based on the second time-domain symbols; and
   wherein a phase of the time-domain symbols is adjusted based on the integer CFO estimate signal.

12. A method for receiving a modulated Orthogonal Frequency Division Multiplexing (OFDM) signal through a channel, comprising:
generating a downconverted modulated OFDM signal based on the modulated OFDM signal;
generating digitized OFDM symbols based on the downconverted modulated OFDM signal;
generating time-domain symbols based on the digitized OFDM symbols;
generating frequency-domain symbols based on the time-domain symbols;
determining an integer carrier frequency offset (CFO) estimate based on the frequency-domain symbols and generating a corresponding CFO estimate signal; and
determining a channel estimate based on the frequency-domain symbols and generating a corresponding channel estimate signal.

13. The method of claim 12 wherein said downconverting step includes operating a local oscillator at a first frequency based on the integer CFO estimate signal.

14. The method of claim 12 further comprising adjusting a phase of the time-domain symbols based on the integer CFO estimate signal.

15. The method of claim 12 further comprising adjusting a rotation of the frequency-domain symbols based on the integer CFO signal.

16. The method of claim 12 further comprising applying the frequency-domain symbols and the channel estimate signal to a Viterbi decoding algorithm.

17. The method of claim 12 wherein the integer CFO estimate is based on $$\hat{L} = \underset{l}{\operatorname{argmax}} \left| \tilde{X}^{(l)*} Y \right|,$$

where l represents an integer CFO, $\tilde{X}^{(l)}$ represents transmitted pilot OFDM symbols that are cyclically shifted by l, and Y represents the frequency-domain symbols.

18. The method of claim 12 wherein the channel estimate includes a channel phase estimate that is based on $\hat{\Theta} = \angle(\tilde{X}^{(\hat{L})} * Y)$, where $\tilde{X}^{(\hat{L})}$ represents transmitted pilot OFDM symbols that are cyclically shifted by $\hat{L}$, $\hat{L}$ represents the integer CFO estimate, and Y represents the frequency-domain symbols.

19. The method of claim 12 wherein the integer CFO estimate is based on $$\hat{L} = \underset{l}{\operatorname{argmax}} \left\{ \sum_{k=0}^{N-1} \left| \sum_{m=0}^{M-1} e^{-j2\pi l m \alpha} X_m^*[k-l] Y_m[k] \right|^2 \right\},$$

where l represents an integer CFO, N represents a number of data samples, M represents a number of transmitted pilot OFDM symbols, and α represents a ratio of a number of cyclic prefix samples ($N_g$) to N.

20. The method of claim 12 wherein the channel estimate is based on $$\hat{H}[k-\hat{L}] = \frac{\sum_{m=0}^{M-1} e^{-j2\pi \hat{L} m \alpha} X_m^*[k-\hat{L}] Y_m[k]}{M},$$

where $\hat{L}$ represents the integer CFO estimate, M represents a number of transmitted pilot OFDM symbols, α represents a ratio of a number of cyclic prefix samples ($N_g$) to a number of data samples (N), $X_m$ represents the $m^{th}$ transmitted pilot OFDM symbol, $\hat{L}$ represents the integer CFO estimate, $Y_m$ represents the $m^{th}$ frequency-domain symbol, and k represents a subcarrier index.

21. The method of claim 12 wherein the method is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

22. The method of claim 12 further comprising generating second time-domain symbols based on the time-domain symbols;
wherein the step of generating the frequency-domain symbols is based on the second time-domain symbols; and
wherein a phase of the time-domain symbols is adjusted based on the integer CFO estimate signal.

23. An Orthogonal Frequency Division Multiplexing (OFDM) receiver that receives a modulated OFDM signal through a channel, the OFDM receiver comprising:
RF downconverter means for generating a downconverted modulated OFDM signal based on the modulated OFDM signal;
analog-to-digital converter (ADC) means for generating digitized OFDM symbols based on the downconverted modulated OFDM signal;
carrier-phase correction means for generating time-domain symbols based on the digitized OFDM symbols;
fast Fourier transform (FFT) means for generating frequency-domain symbols based on the time-domain symbols; and
estimator means for receiving the frequency-domain symbols and determining an integer carrier frequency offset (CFO) estimate and a channel estimate and for generating a respective integer CFO estimate signal and channel estimate signal.

24. The OFDM receiver of claim 23 wherein the RF downconverter means includes local oscillator means for generating a first frequency based on the integer CFO estimate signal.

25. The OFDM receiver of claim 23 wherein the carrier-phase correction means adjusts a phase of the time-domain symbols based on the integer CFO estimate signal.

26. The OFDM receiver of claim 23 wherein the FFT means adjusts a rotation of the frequency-domain symbols based on the integer CFO signal.

27. The OFDM receiver of claim 23 further comprising:
Viterbi decoder means for receiving the frequency-domain symbols and receiving the channel estimate signal.

28. The OFDM receiver of claim 23 wherein the integer CFO estimate is based on $$\hat{L} = \underset{l}{\operatorname{argmax}} \left| \tilde{X}^{(l)*} Y \right|,$$

where l represents an integer CFO, $\tilde{X}^{(l)}$ represents transmitted pilot OFDM symbols that are cyclically shifted by l, and Y represents the frequency-domain symbols.

29. The OFDM receiver of claim 23 wherein the channel estimate includes a channel phase estimate that is based on $\hat{\Theta}=\angle(\tilde{X}^{(\hat{L})}*Y)$, where $\tilde{X}^{(\hat{L})}$ represents transmitted pilot OFDM symbols that are cyclically shifted by $\hat{L}$, $\hat{L}$ represents the integer CFO estimate, and Y represents the frequency-domain symbols.

30. The OFDM receiver of claim 23 wherein the integer CFO estimate is based on $$\hat{L} = \underset{l}{\mathrm{argmax}}\left\{\sum_{k=0}^{N-1}\left|\sum_{m=0}^{M-1}e^{-j2\pi lm\alpha}X_m^*[k-l]Y_m[k]\right|^2\right\},$$

where l represents an integer CFO, N represents a number of data samples, M represents a number of transmitted pilot OFDM symbols, and α represents a ratio of a number of cyclic prefix samples ($N_g$) to N.

31. The OFDM receiver of claim 23 wherein the channel estimate is based on $$\hat{\tilde{H}}[k-\hat{L}] = \frac{\sum_{m=0}^{M-1}e^{-j2\pi \hat{L}m\alpha}X_m^*[k-\hat{L}]Y_m[k]}{M},$$

where $\hat{L}$ represents the integer CFO estimate, M represents a number of transmitted pilot OFDM symbols, α represents a ratio of a number of cyclic prefix samples ($N_g$) to a number of data samples (N), $X_m$ represents the $m^{th}$ transmitted pilot OFDM symbol, $\hat{L}$ represents the integer CFO estimate, $Y_m$ represents the $m^{th}$ frequency-domain symbol, and k represents a subcarrier index.

32. The OFDM receiver of claim 23 wherein the receiver is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

33. The OFDM receiver of claim 23 further comprising cyclic prefix removal means for generating second time-domain symbols based on the time-domain symbols;

wherein the FFT means generates the frequency-domain symbols based on the second time-domain symbols; and wherein a phase of the time-domain symbols is adjusted based on the integer CFO estimate signal.

* * * * *

UNITED STATES PATENT AND TRADEMARK OFFICE
CERTIFICATE OF CORRECTION

PATENT NO. : 7,529,179 B1
APPLICATION NO. : 11/218809
DATED : May 5, 2009
INVENTOR(S) : Jungwon Lee et al.

It is certified that error appears in the above-identified patent and that said Letters Patent is hereby corrected as shown below:

| | |
|---|---|
| Title Page | Under "OTHER PUBLICATIONS", 4 references are duplicates except for a date being listed at the end of the reference which was added by the PTO. Delete "IEEE Std. 802.11a-1999..." |
| Page 2, Column 1 | Delete duplicate reference "802.11n; IEEE P802.11-04..." |
| Page 2, Column 1 | Delete duplicate reference "Comparison of Integer Frequency..." |
| Page 2, Column 1 | Delete duplicate reference "Approximate Maximum Likelihood..." |
| Column 2, Line 25 | Delete "$\tilde{L}, \tilde{L}$" and insert -- $\hat{L}, \hat{L}$ -- |
| Column 5, Line 64 | Delete " $\vec{\Theta}$ " and insert -- $\hat{\Theta}$ -- |
| Column 13, Line 41 | Delete "$e^{j\theta}$" and insert -- $e^{j\Theta}$ -- |
| Column 14, Line 7 | Delete "Left." and insert -- Lett. -- |
| Column 17, Line 21 | Delete " $\hat{\tilde{H}}$ " and insert -- $\hat{H}$ -- |

Signed and Sealed this

Twenty-second Day of September, 2009

David J. Kappos
*Director of the United States Patent and Trademark Office*